(12) United States Patent
Kobayashi

(10) Patent No.: US 12,288,385 B2
(45) Date of Patent: Apr. 29, 2025

(54) LEARNING DEVICE, DETECTION DEVICE, LEARNING SYSTEM, LEARNING METHOD, COMPUTER PROGRAM PRODUCT FOR LEARNING, DETECTION METHOD, AND COMPUTER PROGRAM PRODUCT FOR DETECTING

(71) Applicant: KABUSHIKI KAISHA TOSHIBA, Tokyo (JP)

(72) Inventor: Daisuke Kobayashi, Tachikawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 333 days.

(21) Appl. No.: 17/821,917

(22) Filed: Aug. 24, 2022

(65) Prior Publication Data

US 2023/0230363 A1    Jul. 20, 2023

(30) Foreign Application Priority Data

Jan. 18, 2022    (JP) .................................. 2022-005860

(51) Int. Cl.
   *G06V 10/776*    (2022.01)
   *G06V 10/20*    (2022.01)
   (Continued)

(52) U.S. Cl.
   CPC ............ *G06V 10/776* (2022.01); *G06V 10/22* (2022.01); *G06V 10/255* (2022.01);
   (Continued)

(58) Field of Classification Search
   CPC .... G06V 10/776; G06V 10/22; G06V 10/255; G06V 10/764; G06V 10/774; G06V 10/82; G06V 10/26; G06V 10/25; G06V 20/00
   (Continued)

(56) References Cited

U.S. PATENT DOCUMENTS

2020/0401856 A1 * 12/2020 Kim ..................... G06V 10/44
2021/0390706 A1 * 12/2021 Jie ........................ G06T 7/194
(Continued)

FOREIGN PATENT DOCUMENTS

JP          2020-61066         4/2020
WO    WO 2021/059388 A1    4/2021

OTHER PUBLICATIONS

Yan, et al. "Meta R-CNN: Towards General Solver for Instance-level Few-shot Learning", ICCV2019, https://arXiv:1909.13032v2, 12 pages.
(Continued)

*Primary Examiner* — Ali Bayat
(74) *Attorney, Agent, or Firm* — Oblon, McClelland, Maier & Neustadt, L.L.P.

(57) ABSTRACT

A learning device 10 includes a first learning unit 20. The first learning unit 20 includes a first supervised learning unit 22 and a first self-supervised learning unit 24. The first supervised learning unit 22 learns a first object detection network 30 using learning data 40 so as to reduce a first loss between an output of the first object detection network 30 for detecting an object from target image data and supervised data 40B. Using image data 40A and self-supervised data 40C generated from the image data 40A, the first self-supervised learning unit 24 learns the first object detection network 30 so as to reduce a second loss of a feature amount of a corresponding candidate area P between the image data 40A and the self-supervised data 40C, the second loss being derived by the first object detection network 30.

23 Claims, 11 Drawing Sheets

(51) Int. Cl.
  *G06V 10/22* (2022.01)
  *G06V 10/764* (2022.01)
  *G06V 10/774* (2022.01)
  *G06V 10/82* (2022.01)

(52) U.S. Cl.
  CPC .......... *G06V 10/764* (2022.01); *G06V 10/774* (2022.01); *G06V 10/82* (2022.01)

(58) Field of Classification Search
  USPC ........................................................ 382/103
  See application file for complete search history.

(56) References Cited

U.S. PATENT DOCUMENTS

| | | | |
|---|---|---|---|
| 2022/0083813 A1* | 3/2022 | Du | G06V 10/82 |
| 2024/0062369 A1* | 2/2024 | Jie | G06N 3/08 |
| 2024/0257423 A1* | 8/2024 | Tao | G06T 11/60 |

OTHER PUBLICATIONS

Wang, et al. "Frustratingly Simple Few-Shot Object Detection", ICML2020, https://arxiv.org/pdf/2003.06957.pdf, 12 pages.
Office Action mailed Jan. 7, 2025 in Japanese Application No. 2022-005860 filed Jan. 18, 2022.

* cited by examiner

LEARNING DEVICE, DETECTION DEVICE, LEARNING SYSTEM, LEARNING METHOD, COMPUTER PROGRAM PRODUCT FOR LEARNING, DETECTION METHOD, AND COMPUTER PROGRAM PRODUCT FOR DETECTING

CROSS-REFERENCE TO RELATED APPLICATIONS

This application is based upon and claims the benefit of priority from Japanese Patent Application No. 2022-005860, filed on Jan. 18, 2022; the entire contents of which are incorporated herein by reference.

FIELD

Embodiments described herein relate generally to a learning device, a detection device, a learning system, a learning method, a computer program product for learning, a detection method, and a computer program product for detecting.

BACKGROUND

In recent years, detection accuracy has largely advanced by an object detection method using a convolutional neural network (CNN). However, in order to achieve excellent performance, taught abundant data of a learning target is required. Therefore, learning using a small amount of data has been studied. For example, a method for efficiently learning a new class with a small amount of data using knowledge learned with abundant data is disclosed.

Multi-task learning is disclosed that estimates a conversion content for each image conversion type by self-supervised learning without using supervised data. However, such a technique is adapted only to a classification task, and whether or not the task is useful for object detection has not been verified. A technique is disclosed that is quickly adapted to a new class by performing conditioning by multiplication of a feature vector for each class extracted from a set of a small amount of data and a feature obtained from an object detection network. Another technique indicates that fine tuning of only classification and regression at a subsequent stage of a detection network is effective in learning with a small amount of data. However, in such techniques, supervised data learned in advance hardly includes information of a new class. Therefore, in such techniques, expression ability to detect a new class is insufficient. That is, in related art, it is difficult to improve object detection accuracy by learning using a smaller amount of learning data.

DETAILED DESCRIPTION

According to an embodiment, a learning device includes a first learning unit including a first supervised learning unit and a first self-supervised learning unit. The first supervised learning unit learns, using learning data including image data and supervised data including a class representing a correct object detection result of an object area included in the image data and position information of the object area in the image data, a first object detection network for detecting an object from target image data so as to reduce a first loss between an output of the first object detection network and the supervised data. The first self-supervised learning unit learns, using the image data and self-supervised data generated from the image data, the first object detection network so as to reduce a second loss of a feature amount of a corresponding candidate area between the image data and the self-supervised data, where the second loss is derived by the first object detection network.

Hereinafter, a learning device, a detection device, a learning system, a learning method, a computer program product for learning, a detection method, and a computer program product for detecting will be described in detail with reference to the attached drawings.

First Embodiment

Figure 1:
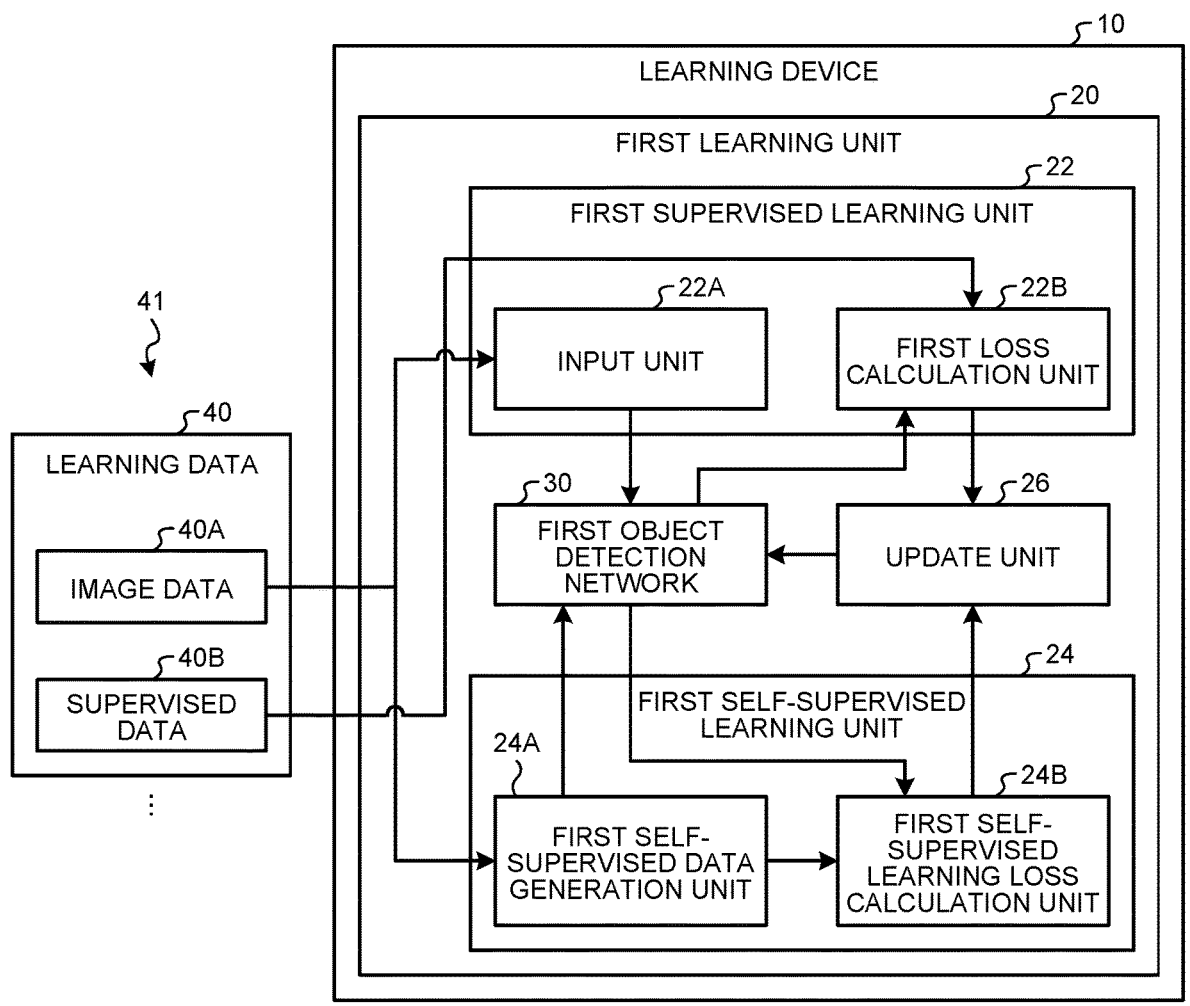
FIG. 1 is a block diagram of a learning device.

FIG. 1 is a block diagram illustrating an example of a configuration of a learning device 10 according to the present embodiment.

The learning device 10 is an information processing device that learns an object detection network for detecting an object included in image data.

The learning device 10 of the present embodiment is suitably applied to learning of an object detection network, for example, used for person detection included in a video captured by a security camera or vehicle detection included in a video captured by an in-vehicle camera.

The learning device 10 of the present embodiment includes a first learning unit 20. The first learning unit 20 learns a first object detection network 30. The first object detection network 30 is an example of the object detection network.

The first object detection network 30 is a neural network for detecting an object included in target image data of an object detection target. For example, the first object detection network 30 is a neural network that receives image data as an input and outputs a class representing an object detection result of an object area included in the image data and position information of the object area.

The first object detection network 30 only needs to be a neural network for performing object detection, and a detection method thereof is not limited.

Examples of the first object detection network 30 include those using a convolution neural network (CNN) such as VGG or ResNet as a backbone. In addition, examples of the first object detection network 30 further include those using a method for directly performing class classification of a target object and regression of an area for each pixel of a feature map to estimate position information of an object area and identification of a class of the object area. Examples of this method include Single Shot Multibox Detector (SSD)

that is a one-stage detector and Fully Convolutional One-Stage Object Detection (FCOS).

In addition, for the first object detection network 30, a two-stage detector that performs class classification and regression of an object area after extracting an object candidate area may be used. Examples of the two-stage detector include Faster R-CNN.

In addition, for the first object detection network 30, a detection method based on a correlation with a feature vector for each class may be used. Examples of this detection method include Meta R-CNN.

The first learning unit 20 learns the first object detection network 30 using learning data 40.

The learning data 40 includes image data 40A and supervised data 40B.

The image data 40A is image data used for learning of the first object detection network 30. The image data 40A is image data to which the supervised data 40B is not added.

The supervised data 40B is data directly or indirectly representing correct data to be output from the first object detection network 30 when the image data 40A is input to the first object detection network 30 at the time of learning. In the present embodiment, the supervised data 40B includes a class representing a correct object detection result of an object area included in the image data 40A and position information of the object area in the image data 40A. The object area is represented as, for example, a rectangular area having a rectangular shape on an image of the image data 40A. The position information of the object area is represented as, for example, information indicating the position of the object area on an image of the image data 40A.

The first learning unit 20 includes a first supervised learning unit 22, a first self-supervised learning unit 24, and an update unit 26. The first supervised learning unit 22 includes an input unit 22A and a first loss calculation unit 22B. The first self-supervised learning unit 24 includes a first self-supervised data generation unit 24A and a first self-supervised learning loss calculation unit 24B.

The first supervised learning unit 22, the first self-supervised learning unit 24, the update unit 26, the input unit 22A, the first loss calculation unit 22B, the first self-supervised data generation unit 24A, and the first self-supervised learning loss calculation unit 24B are implemented by, for example, one or more processors. For example, each of the above units may be implemented by causing a processor such as a central processing unit (CPU) or a graphics processing unit (GPU) to execute a program, that is, by software. Each of the above units may be implemented by a processor such as a dedicated IC, that is, by hardware. Each of the above units may be implemented by using software and hardware in combination. In a case of using a plurality of processors, each of the processors may implement one of the units, or may implement two or more of the units.

Note that the learning data 40 and the first object detection network 30 may be stored in a storage unit disposed outside the learning device 10. In addition, at least one of the storage unit and the plurality of functional units included in the first learning unit 20 may be mounted on an external information processing device communicably connected to the learning device 10 via a network or the like.

The first supervised learning unit 22 learns the first object detection network 30 using the learning data 40. That is, the first supervised learning unit 22 learns the first object detection network 30 using supervised data that is the image data 40A to which the supervised data 40B is added.

The first supervised learning unit 22 learns the first object detection network 30 using the learning data 40 so as to reduce a first loss between an output of the first object detection network 30 and the supervised data 40B. The first supervised learning unit 22 includes the input unit 22A and the first loss calculation unit 22B.

The input unit 22A acquires learning data 40 including an arbitrary mini-batch size number of pieces of data from a learning data set 41 including a plurality of pieces of the learning data 40, and inputs the image data 40A included in the learning data 40 to the first object detection network 30.

The first loss calculation unit 22B acquires a detection result including a class of an object area and position information of the object area, the detection result being output from the first object detection network 30 by inputting the image data 40A to the first object detection network 30 by the input unit 22A. The first loss calculation unit 22B calculates a loss of the acquired detection result with respect to the supervised data 40B corresponding to the image data 40A as the first loss.

For example, it is assumed that the first object detection network 30 is a one-stage detector using the above-explained SSD. In this case, for example, the first loss calculation unit 22B calculates a loss for class classification of a detection target and a loss function for specifying a position using the following formula (1).

$$L(x, c, l, g) = \frac{1}{N}(L_{conf}(x, c) + \alpha L_{loc}(x, l, g)) \quad (1)$$

In formula (1), $L_{conf}$ represents a loss for class classification, and $L_{loc}$ represents a loss for position estimation. In addition, in formula (1), x is a constant indicating whether or not an object area corresponds to a correct object area that is a correct rectangle. x represents 1 when an object area F corresponds to a correct object area, and represents 0 when the object area does not correspond to the correct object area. c represents class reliability. l represents a predicted rectangle. g represents a correct rectangle. The rectangle means an object area that is a rectangular area. α represents a coefficient for adjusting a loss weight.

In this case, the first loss calculation unit 22B only needs to calculate the first loss by calculating a loss and a loss function in a similar manner to a conventional technology. Note that the first loss calculation unit 22B only needs to use a loss function corresponding to an object detection method of the first object detection network 30, and is not limited to a method using the above formula (1).

The first loss calculated by the first loss calculation unit 22B is output to the update unit 26.

The update unit 26 updates a parameter of the first object detection network 30 so as to reduce the first loss (details will be described later). Note that the process of updating a parameter of the first object detection network 30 according to the first loss may be executed by the first supervised learning unit 22. That is, each of the first supervised learning unit 22 and the first self-supervised learning unit 24 described later may include the update unit 26.

In addition, the update unit 26 may update a parameter of the first object detection network 30 using the first loss calculated by the first supervised learning unit 22 and a second loss described later after the second loss is calculated by the first self-supervised learning unit 24 described later. In the present embodiment, a mode in which the update unit 26 updates a parameter of the first object detection network 30 using the first loss calculated by the first supervised learning unit 22 and the second loss described later after the second loss is calculated by the first self-supervised learning unit 24 described later will be described as an example.

Using the image data 40A and self-supervised data generated from the image data 40A, the first self-supervised learning unit 24 learns the first object detection network 30 so as to reduce the second loss that is a difference between a feature amount of a candidate area in the image data 40A and a feature amount of a corresponding candidate area in the self-supervised data, the second loss being derived by the first object detection network 30.

The first self-supervised learning unit 24 includes the first self-supervised data generation unit 24A and the first self-supervised learning loss calculation unit 24B.

The first self-supervised data generation unit 24A generates self-supervised data that is converted image data obtained by image-converting the image data 40A. In addition, the first self-supervised data generation unit 24A specifies one or more pairs of corresponding candidate areas between the image data 40A and the self-supervised data from the image data 40A and the self-supervised data.

Figure 2A:
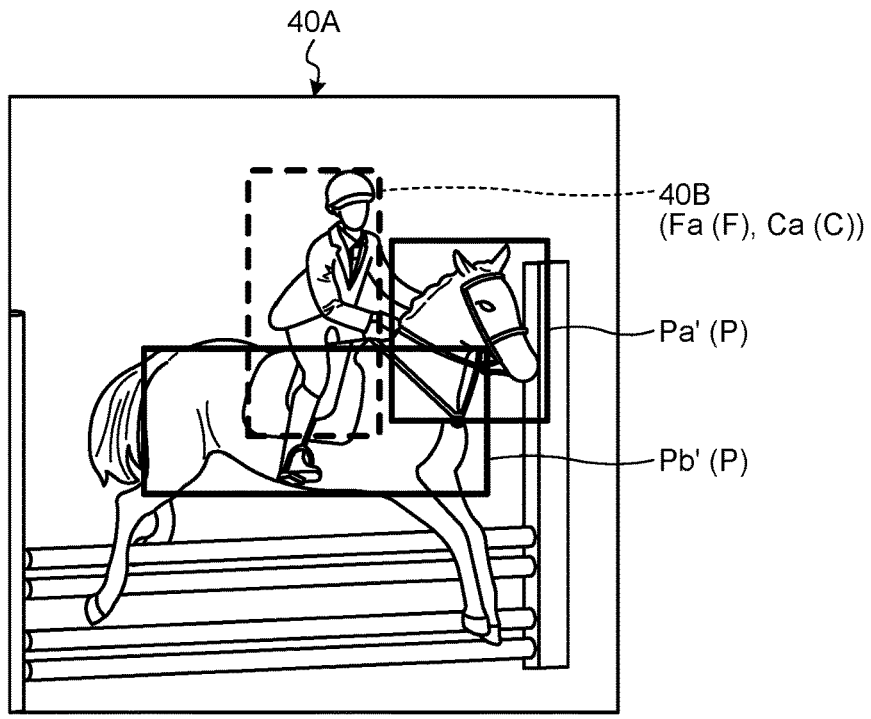
FIG. 2A is an explanatory diagram for specifying a candidate area.

FIG. 2A is an explanatory diagram of a specific example of a candidate area P. The first self-supervised data generation unit 24A specifies one or more rectangular areas from the image data 40A as the candidate areas P for feature extraction.

The first self-supervised data generation unit 24A specifies, as the candidate area P, a randomly specified area in the image data 40A or an area specified by a foreground extraction method for extracting an object-like area from the image data 40A.

In the case of specifying the candidate area P by the foreground extraction method, for example, the first self-supervised data generation unit 24A only needs to specify an object-like area as the candidate area P using Selective Search or the like.

FIG. 2A illustrates, as an example, a scene where the first self-supervised data generation unit 24A specifies a candidate area Pa' and a candidate area Pb' as the candidate areas P.

When the first self-supervised data generation unit 24A specifies the candidate area P from the image data 40A, the candidate area P including an area at least partially non-overlapping with the object area F is specified.

Here, for example, it is assumed that a class Ca of an object area Fa included in the image data 40A and position information of the object area Fa are defined in the supervised data 40B corresponding to the image data 40A. The object area Fa is an example of the object area F included in the image data 40A. The class Ca is an example of a class C of the object area F. That is, it is assumed that the image data 40A includes the object area Fa as the object area F to which the class C is taught.

When the first self-supervised data generation unit 24A specifies a randomly specified area or an object-like area as the candidate area P from the image data 40A, the specified candidate area P includes an area other than the object area F included in the image data 40A. That is, the first self-supervised data generation unit 24A specifies, as the candidate area P, an area included in the image data 40A and including a background area that is an area to which the class C is not taught by the supervised data 40B.

Note that the first self-supervised data generation unit 24A may specify, as the candidate area P, an area at least partially non-overlapping with the object area F specified by the supervised data 40B among the plurality of candidate areas P specified from the image data 40A by the above method. In addition, the first self-supervised data generation unit 24A may select a predetermined number of candidate areas P randomly or in descending order of object likelihood among the plurality of candidate areas P specified by the above method from the image data 40A, and specify the selected area as the candidate area P.

The first self-supervised data generation unit 24A specifies the candidate area P and executes a generation process of generating self-supervised data from the image data 40A.

The self-supervised data is converted image data obtained by image-converting the image data 40A.

Figure 2B:
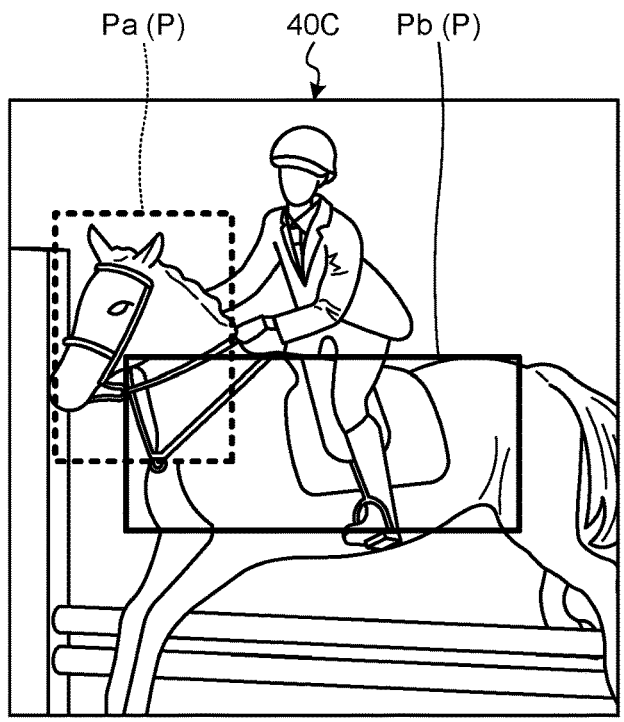
FIG. 2B is a schematic diagram of self-supervised data.

FIG. 2B is a schematic diagram of an example of self-supervised data 40C generated from the image data 40A.

The first self-supervised data generation unit 24A generates one or more pieces of self-supervised data 40C from one piece of the image data 40A by performing at least one image conversion among luminance conversion, color tone conversion, contrast conversion, inversion, rotation, and cropping on the image data 40A. FIG. 2B illustrates an example of the self-supervised data 40C generated by inverting the image data 40A.

For the generated self-supervised data 40C, the first self-supervised data generation unit 24A specifies a generation source of the self-supervised data 40C, that is, a candidate area P corresponding to each of one or more candidate areas P in the image data 40A before image conversion of the self-supervised data 40C.

A candidate area P in the image data 40A is the same area as a candidate area P corresponding to the candidate area P in the self-supervised data 40C. In other words, a candidate area P in the image data 40A is the same area as a corresponding candidate area P in the self-supervised data 40C before and after image conversion.

FIG. 2B illustrates a state in which the first self-supervised data generation unit 24A specifies a candidate area Pa corresponding to a candidate area Pa' in the image data 40A and a candidate area Pb corresponding to a candidate area Pb' in the image data 40A from the self-supervised data 40C.

For example, the first self-supervised data generation unit 24A specifies, as a corresponding candidate area P in the self-supervised data 40C, an area at the same position and in the same range as a candidate area P specified in the image data 40A that is image data before image conversion of the self-supervised data 40C in the self-supervised data 40C. Note that the first self-supervised data generation unit 24A may generate the self-supervised data 40C by performing image conversion including coordinate transformation that affects a coordinate position, such as inversion, rotation, or cropping. In this case, the first self-supervised data generation unit 24A only needs to specify a candidate area P that is the corresponding same area in the self-supervised data 40C by performing the same coordinate transformation on a specified candidate area P in the image data 40A.

Through these processes, the first self-supervised data generation unit 24A generates the self-supervised data 40C that is converted image data obtained by image-converting the image data 40A. In addition, the first self-supervised data generation unit 24A specifies one or more pairs of candidate areas P that are the corresponding same areas between the image data 40A and the self-supervised data 40C from the image data 40A and the self-supervised data 40C.

Returning to FIG. 1, the description will be continued.

The first self-supervised data generation unit 24A inputs the image data 40A and the self-supervised data 40C generated from the image data 40A to the first object detection network 30.

The first self-supervised learning loss calculation unit 24B calculates the second loss of a feature amount of a corresponding candidate area P in the self-supervised data 40C with respect to a feature amount of a candidate area P in the image data 40A, the second loss being derived by the first object detection network 30 by inputting the image data 40A and the self-supervised data 40C.

Each of the image data 40A and the self-supervised data 40C input to the first object detection network 30 is processed according to a parameter in the first object detection network 30, whereby the feature amount is output as an array from an intermediate layer or a final layer of the first object detection network 30. The feature amount is represented by, for example, a vector of a group of feature values, that is, a feature vector.

For example, the first self-supervised data generation unit 24A inputs the image data 40A, the self-supervised data 40C generated from the image data 40A, and information indicating a pair of candidate areas P corresponding to the image data 40A and the self-supervised data 40C to the first object detection network 30.

Then, the first self-supervised learning loss calculation unit 24B extracts a feature amount of a candidate area P that is the same area between the image data 40A and the self-supervised data 40C generated from the image data 40A. For example, the first self-supervised learning loss calculation unit 24B only needs to extract a feature amount of a corresponding candidate area P from each of the image data 40A and the self-supervised data 40C using ROIAlign with respect to a feature map of an intermediate layer of the first object detection network 30.

Then, the first self-supervised learning loss calculation unit 24B calculates the second loss that is a loss function of a corresponding candidate area P that is the same area between the image data 40A and the self-supervised data 40C generated from the image data 40A by the following formula (2). In addition, for this loss function, Mean Squared Error (MSE), InfoNCE, or the like may be used.

$$L_{unsup}(p_i, p_j) = 2 - 2 \cdot \frac{\langle p_i, p_j \rangle}{\|p_i\|_2 \cdot \|p_j\|_2} \quad (2)$$

In formula (2), pi represents a feature vector of a candidate area P in the image data 40A, and $P_j$ represents a feature vector of a candidate area P corresponding to the candidate area P in the self-supervised data 40C. $L_{unsup}$ represents a loss function. (pi, pj) represents a pair of feature vectors of corresponding candidate areas P.

When the first object detection network 30 is a method based on a feature vector for each class, such as Meta R-CNN, it is only required to use the following method. In this case, the first self-supervised learning loss calculation unit 24B may calculate the second loss using the loss function indicated in the above formula (1) so as to detect a corresponding candidate area P that is the same area in the image data 40A before image conversion of the self-supervised data 40C based on a feature amount of a candidate area P in the self-supervised data 40C.

Then, the first self-supervised learning loss calculation unit 24B only needs to calculate the loss function as the second loss.

In addition, the first self-supervised data generation unit 24A may input the image data 40A and the self-supervised data 40C generated from the image data 40A to the first object detection network 30. Then, the first self-supervised data generation unit 24A may output information indicating a pair of candidate areas P corresponding to the image data 40A and the self-supervised data 40C to the first self-supervised learning loss calculation unit 24B.

In this case, the first self-supervised learning loss calculation unit 24B extracts a feature amount of a candidate area P specified by information indicating a pair of candidate areas P received from the first self-supervised data generation unit 24A among feature amounts output as an array from an intermediate layer or a final layer by processing each of the image data 40A and the self-supervised data 40C in accordance with a parameter of the first object detection network 30. Through these processes, the first self-supervised learning loss calculation unit 24B only needs to extract a feature amount of a candidate area P that is the same area between the image data 40A and the self-supervised data 40C generated from the image data 40A, and to calculate the second loss in a similar manner to the above.

The second loss calculated by the first self-supervised learning loss calculation unit 24B is output to the update unit 26.

The update unit 26 updates a parameter of the first object detection network 30 so as to reduce the second loss. That is, the update unit 26 updates a parameter of the first object detection network 30 so as to reduce both the first loss received from the first loss calculation unit 22B and the second loss received from the first self-supervised learning loss calculation unit 24B.

Specifically, the update unit 26 updates a parameter of the first object detection network 30 by causing errors of each of the first loss received from the first loss calculation unit 22B and the second loss received from the first self-supervised learning loss calculation unit 24B to be propagated backwards to the first object detection network 30.

Note that the process of updating a parameter of the first object detection network 30 according to the second loss may be executed by the first self-supervised learning unit 24. That is, each of the first supervised learning unit 22 and the first self-supervised learning unit 24 may include the update unit 26.

In addition, the first learning unit 20 may include the first object detection network 30 for the first supervised learning unit 22 and the first object detection network 30 for the first self-supervised learning unit 24.

In this case, the update unit 26 updates a parameter of the first object detection network 30 for the first supervised learning unit 22 so as to reduce the first loss received from the first loss calculation unit 22B.

Then, after learning of the first object detection network 30 for the first supervised learning unit 22 by the first supervised learning unit 22 is ended, the update unit 26 may reflect the parameter of the first object detection network 30 for the first supervised learning unit 22 in the first object detection network 30 for the first self-supervised learning unit 24 in stages. In addition, the update unit 26 may reflect the parameter of the first object detection network 30 for the first supervised learning unit 22 in the first object detection network 30 for the first self-supervised learning unit 24 in stages during learning of the first object detection network 30 for the first supervised learning unit 22 by the first supervised learning unit 22.

Then, after learning of the first object detection network 30 for the first supervised learning unit 22 by the first supervised learning unit 22 is ended, the update unit 26 may update the parameter of the first object detection network 30 for the first self-supervised learning unit 24 so as to reduce the second loss received from the first self-supervised learning loss calculation unit 24B.

Next, an example of a flow of information processing executed by the learning device 10 of the present embodiment will be described.

Figure 3:
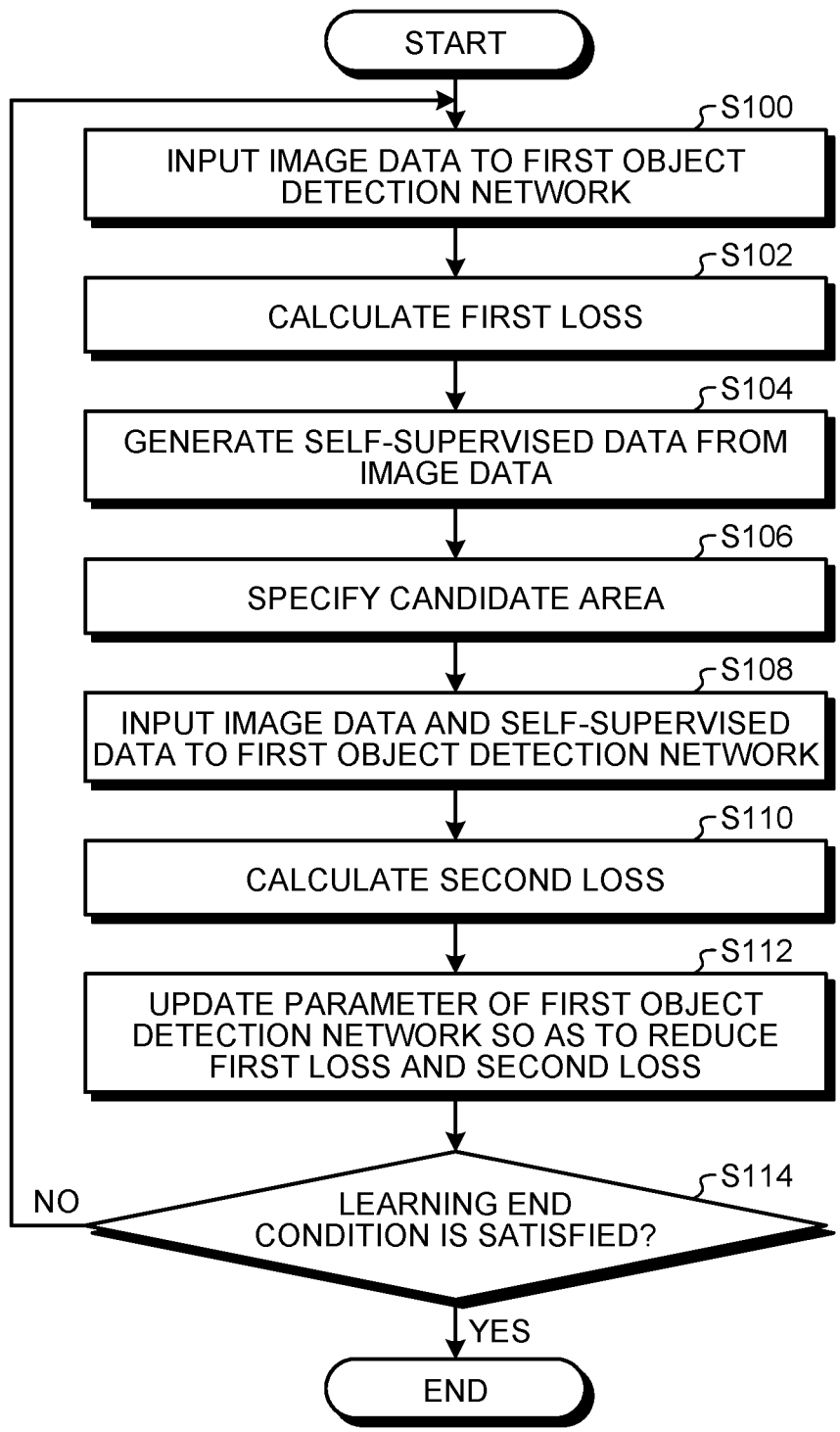
FIG. 3 is a flowchart of a flow of information processing.

FIG. 3 is a flowchart illustrating an example of a flow of information processing executed by the learning device 10 of the present embodiment.

The input unit 22A of the first supervised learning unit 22 acquires learning data 40 including an arbitrary mini-batch size number of pieces of data from the learning data set 41 including a plurality of pieces of the learning data 40, and inputs the image data 40A included in the learning data 40 to the first object detection network 30 (Step S100).

The first loss calculation unit 22B calculates, as the first loss, a loss of a detection result including the class C of the object area F and position information of the object area F output from the first object detection network 30 through the process in Step S100 with respect to the supervised data 40B corresponding to the image data 40A (Step S102).

The first self-supervised data generation unit 24A generates the self-supervised data 40C from the image data 40A input to the first object detection network 30 in Step S100 (Step S104).

In addition, the first self-supervised data generation unit 24A specifies a corresponding candidate area P for each of the image data 40A input to the first object detection network 30 in Step S100 and the self-supervised data 40C generated in Step S104 (Step S106).

The first self-supervised data generation unit 24A inputs the self-supervised data 40C generated in Step S104 and the image data 40A used for generating the self-supervised data 40C to the first object detection network 30 (Step S108).

The first self-supervised learning loss calculation unit 24B calculates the second loss of a feature amount derived by the first object detection network 30 for a corresponding candidate area P that is the same area between the self-supervised data 40C generated in Step S104 and the image data 40A used for generating the self-supervised data 40C (Step S110). Specifically, the first self-supervised learning loss calculation unit 24B calculates the second loss of a feature amount of a corresponding candidate area P in the self-supervised data 40C with respect to a feature amount of a candidate area P in the image data 40A, the second loss being derived by the first object detection network 30 by inputting the image data 40A and the self-supervised data 40C.

The update unit 26 updates a parameter of the first object detection network 30 so as to reduce both the first loss calculated in Step S102 and the second loss calculated in Step S110 (Step S112).

Next, the first learning unit 20 determines whether or not a learning end condition of the first object detection network 30 is satisfied (Step S114). For example, the first learning unit 20 determines whether or not the number of repetitions of the series of processes in Step S100 to Step S112 is a predetermined threshold or more, thereby making determination in Step S114. If a negative determination is made in Step S114 (Step S114: No), the process returns to Step S100. If an affirmative determination is made in Step S114 (Step S114: Yes), this routine is ended.

As described above, the learning device 10 of the present embodiment includes the first learning unit 20. The first learning unit 20 includes the first supervised learning unit 22 and the first self-supervised learning unit 24. The learning data 40 includes the image data 40A and the supervised data 40B including the class C representing a correct object detection result of the object area F included in the image data 40A and position information of the object area F in the image data 40A.

The first supervised learning unit 22 learns the first object detection network 30 using the learning data 40 so as to reduce the first loss between an output of the first object detection network 30 for detecting an object from target image data and the supervised data 40B. Using the image data 40A and the self-supervised data 40C generated from the image data 40A, the first self-supervised learning unit 24 learns the first object detection network 30 so as to reduce the second loss of a feature amount of a corresponding candidate area P between the image data 40A and the self-supervised data 40C, the second loss being derived by the first object detection network 30.

The first supervised learning unit 22 of the learning device 10 of the present embodiment learns the first object detection network 30 using the supervised data 40B. In addition, the learning device 10 of the present embodiment learns the first object detection network 30 so as to reduce the second loss of a feature amount of a corresponding candidate area P between the image data 40A and the self-supervised data 40C.

That is, the learning device 10 of the present embodiment learns the first object detection network 30 by self-supervised learning such that, for a candidate area P including a background area that is an area where the class C is not taught, the same candidate area P has the same feature amount between the image data 40A and the self-supervised data 40C generated from the image data 40A.

Therefore, the learning device 10 of the present embodiment can learn the first object detection network 30 capable of performing object detection with high accuracy even for a candidate area P where the class C is not taught by the supervised data 40B. In other words, the learning device 10 of the present embodiment can learn the first object detection network 30 capable of performing object detection with high accuracy using a small amount of image data 40A including a candidate area P of a new class C that is not taught as the supervised data 40B.

In addition, the learning device 10 of the present embodiment learns the first object detection network 30 using the self-supervised data 40C generated from the image data 40A. Therefore, the learning device 10 of the present embodiment can learn the first object detection network 30 using a smaller amount of learning data 40. That is, the learning device 10 of the present embodiment can improve object detection accuracy of the new class C that is not taught as the supervised data 40B using a smaller amount of learning data 40.

Therefore, the learning device 10 of the present embodiment can improve object detection accuracy by learning using a smaller amount of learning data 40.

Second Embodiment

In the present embodiment, an example of a learning device capable of efficiently responding to a small amount of new image data by using the learned first object detection network 30 learned by the first learning unit 20 of the above embodiment will be described. Note that, in the present embodiment, the same reference numerals are given to components similar to those of the above embodiment, and a detailed description thereof will be omitted.

Figure 4:
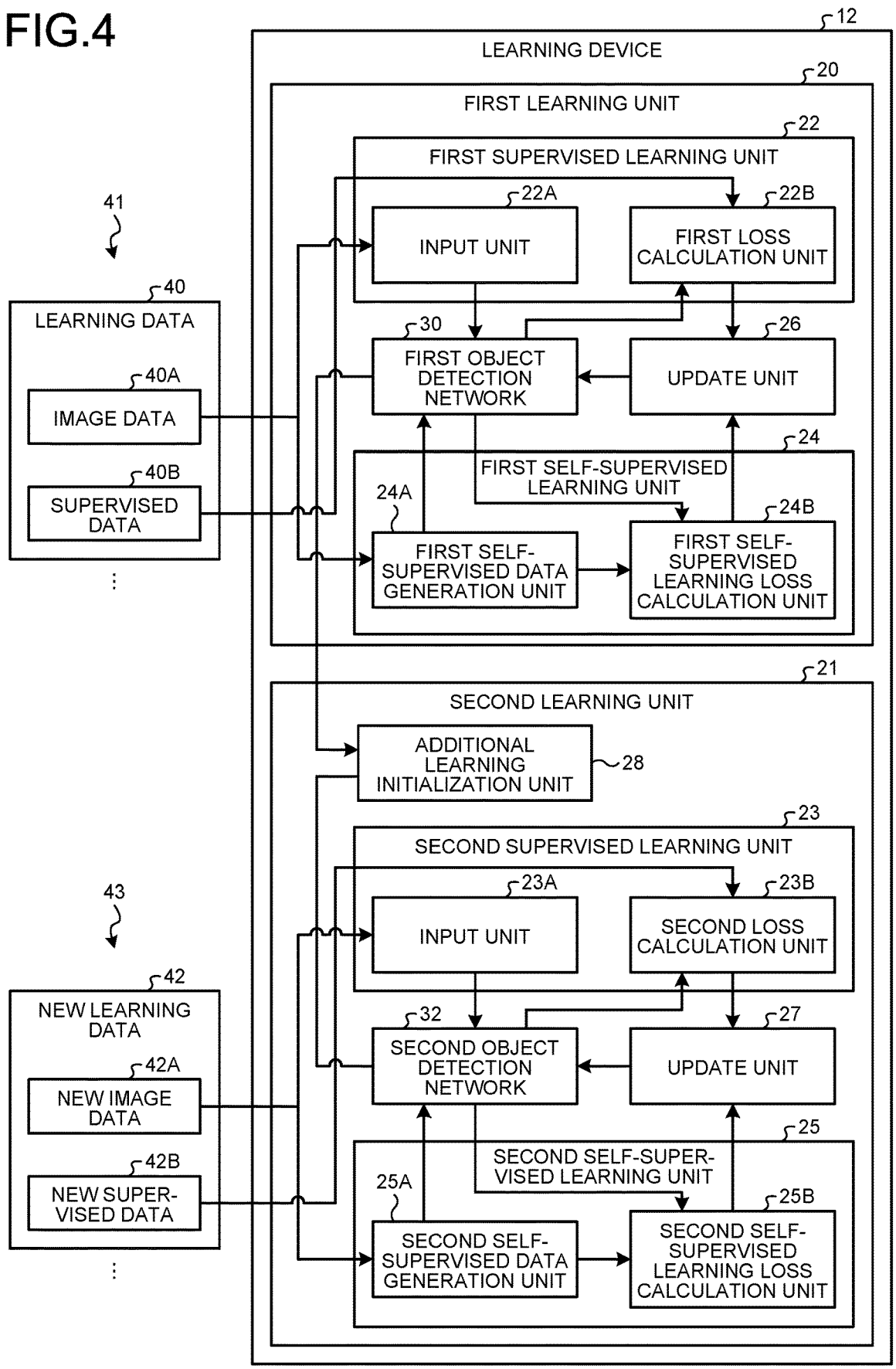
FIG. 4 is a block diagram of a learning device.

FIG. 4 is a block diagram illustrating an example of a configuration of a learning device 12 according to the present embodiment.

The learning device 12 includes a first learning unit 20 and a second learning unit 21. The first learning unit 20 is similar to that of the first embodiment.

The second learning unit 21 learns a second object detection network 32 using new learning data 42 different from learning data 40 and a first object detection network 30 learned by the first learning unit 20.

Similar to the first object detection network 30, the second object detection network 32 is a neural network for detecting an object included in target image data of an object detection target. The second object detection network 32 is similar to the first object detection network 30 except that the second object detection network is an object detection network learned by the second learning unit 21. A method for detecting an object by the second object detection network 32 may be the same as or different from that of the first object detection network 30. Since specific examples of the detection method by the second object detection network 32 are similar to those of the above-described detection method by the first object detection network 30, description thereof will be omitted here.

The second learning unit 21 includes an additional learning initialization unit 28, a second supervised learning unit 23, a second self-supervised learning unit 25, and an update unit 27. The second supervised learning unit 23 includes an input unit 23A and a second loss calculation unit 23B. The second self-supervised learning unit 25 includes a second self-supervised data generation unit 25A and a second self-supervised learning loss calculation unit 25B. The additional learning initialization unit 28, the second supervised learning unit 23, the input unit 23A, the second loss calculation unit 23B, the second self-supervised learning unit 25, the second self-supervised data generation unit 25A, the second self-supervised learning loss calculation unit 25B, and the update unit 27 are implemented by, for example, one or more processors.

The additional learning initialization unit 28 initializes the second object detection network 32 using the first object detection network 30 learned by the first learning unit 20.

Specifically, the additional learning initialization unit 28 applies parameters of at least some tasks set in the first object detection network 30 to the second object detection network 32. In addition, the additional learning initialization unit 28 initializes a parameter of a new class with a random number. For example, it is assumed that the second object detection network 32 is an object detection network based on a correlation with a feature vector for each class as in Meta R-CNN. In this case, the additional learning initialization unit 28 only needs to use, as a feature vector of a new class, one obtained by extracting a feature amount of an area where the new class of the new learning data 42 is taught using ROIAlign.

Note that the additional learning initialization unit 28 may apply all the parameters of each of a plurality of tasks included in the first object detection network 30 to the second object detection network 32. In addition, the additional learning initialization unit 28 may apply a parameter of a predetermined task included in the first object detection network 30 as a parameter of a corresponding task in the second object detection network 32. A parameter of a task to be applied to the second object detection network 32 may be set in advance by, for example, an operation instruction by a user. In addition, the task to be applied may be appropriately changed by an operation instruction or the like by a user.

In addition, the additional learning initialization unit 28 may set a task to be learned in the second object detection network 32 so as to learn a parameter of the same task as in the first object detection network 30. In addition, the additional learning initialization unit 28 may set some tasks among tasks of parameters learned in the first object detection network 30 as tasks to be learned. In addition, the task to be learned may be appropriately changed by an operation instruction or the like by a user.

The new learning data 42 includes new image data 42A and new supervised data 42B.

The new image data 42A is image data newly prepared for learning separately from the image data 40A used at the time of learning of the first object detection network 30 by the first learning unit 20. For example, the new image data 42A is image data different from the image data 40A. Similar to the image data 40A, the new image data 42A is image data to which the new supervised data 42B is not added.

Similar to the supervised data 40B, the new supervised data 42B is data directly or indirectly representing correct data to be output from the second object detection network 32 when the new image data 42A is input to the second object detection network 32 at the time of learning. In the present embodiment, the new supervised data 42B includes a class C representing a correct object detection result of an object area F included in the new image data 42A and position information of the object area F in the new image data 42A. The object area F and the position information are similar to those in the above embodiment.

Note that a new learning data set 43 including a plurality of pieces of the new learning data 42 and the second object detection network 32 may be stored in a storage unit disposed outside the learning device 12. In addition, at least one of the storage unit and the plurality of functional units included in the second learning unit 21 may be mounted on an external information processing device communicably connected to the learning device 12 via a network or the like.

The second supervised learning unit 23 is similar to the first supervised learning unit 22 of the first learning unit 20 except that the new learning data 42 is used instead of the learning data 40. That is, the input unit 23A and the second loss calculation unit 23B of the second supervised learning unit 23 are similar to the input unit 22A and the first loss calculation unit 22B of the first supervised learning unit 22, respectively, except that the new learning data 42 is used instead of the learning data 40. Note that, in the present embodiment, a loss calculated by the second loss calculation unit 23B will be referred to as a third loss.

The second self-supervised learning unit 25 is similar to the first self-supervised learning unit 24 of the first learning unit 20 except that the new image data 42A is used instead of the image data 40A. That is, the second self-supervised data generation unit 25A and the second self-supervised learning loss calculation unit 25B of the second self-supervised learning unit 25 are similar to the first self-supervised data generation unit 24A and the first self-supervised learning loss calculation unit 24B of the first self-supervised learning unit 24, respectively, except that the new image data 42A is used instead of the image data 40A. Note that, in the present embodiment, a loss calculated by the second self-supervised learning loss calculation unit 25B will be referred to as a fourth loss.

The update unit 27 receives the third loss from the second loss calculation unit 23B instead of the first loss received from the first loss calculation unit 22B. In addition, the update unit 27 receives the fourth loss from the second self-supervised learning loss calculation unit 25B instead of the second loss received from the first self-supervised learning loss calculation unit 24B. Then, the update unit 27 updates a parameter of the second object detection network 32 using the third loss and the fourth loss. Except for these points, the update unit 27 updates a parameter of the second object detection network 32 in a similar manner to the update unit 26.

Next, an example of a flow of information processing executed by the learning device 12 of the present embodiment will be described.

Figure 5:
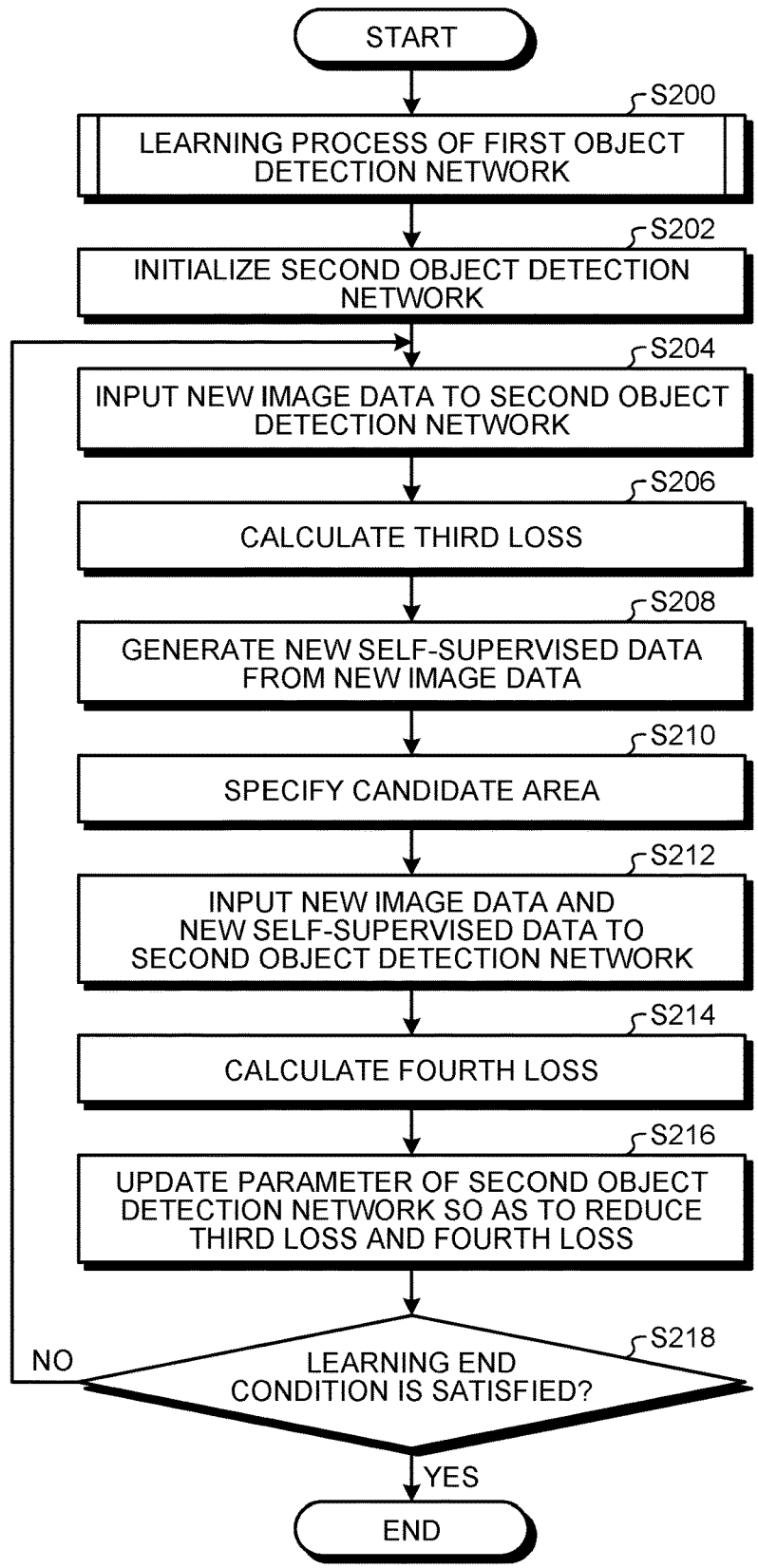
FIG. 5 is a flowchart of a flow of information processing.

FIG. 5 is a flowchart illustrating an example of a flow of information processing executed by the learning device 12 of the present embodiment.

The first learning unit 20 executes a learning process of the first object detection network 30 using the learning data 40 (Step S200). The process in Step S200 is similar to the processes in Steps S100 to S114 of the above embodiment (see FIG. 3).

Next, the additional learning initialization unit 28 of the second learning unit 21 initializes the second object detection network 32 using the first object detection network 30 learned by the first learning unit 20 in Step S200 (Step S202).

Next, the input unit 23A of the second supervised learning unit 23 acquires the new learning data 42 including an arbitrary mini-batch size number of pieces of data from the new learning data set 43 including a plurality of pieces of the new learning data 42, and inputs the new image data 42A included in the new learning data 42 to the second object detection network 32 (Step S204).

The second loss calculation unit 23B calculates, as the third loss, a loss of a detection result including the class C of the object area F and position information of the object area F output from the second object detection network 32 through the process in Step S204 with respect to the new supervised data 42B corresponding to the new image data 42A (Step S206).

The second self-supervised data generation unit 25A of the second self-supervised learning unit 25 generates new self-supervised data from the new image data 42A input to the second object detection network 32 in Step S204 (Step S208).

In addition, the second self-supervised data generation unit 25A specifies a candidate area P that is the corresponding same area for each of the new self-supervised data generated in Step S208 and the new image data 42A used for generating the new self-supervised data (Step S210).

The second self-supervised data generation unit 25A inputs the new self-supervised data generated in Step S208 and the new image data 42A used for generating the new self-supervised data to the second object detection network 32 (Step S212).

The second self-supervised learning loss calculation unit 25B calculates the fourth loss of a feature amount derived by the second object detection network 32 for a corresponding candidate area P that is the same area between the new self-supervised data generated in Step S208 and the new image data 42A used for generating the new self-supervised data (Step S214). The second self-supervised learning loss calculation unit 25B calculates the fourth loss of a feature amount of a corresponding candidate area P in the new self-supervised data with respect to a feature amount of a candidate area P in the new image data 42A, the fourth loss being derived by the second object detection network 32 by inputting the new image data 42A and the new self-supervised data.

The update unit 27 updates a parameter of the second object detection network 32 so as to reduce both the third loss calculated in Step S206 and the fourth loss calculated in Step S214 (Step S216).

Next, the second learning unit 21 determines whether or not a learning end condition of the second object detection network 32 is satisfied (Step S218). For example, the second learning unit 21 determines whether or not the number of repetitions of the series of processes in Step S204 to Step S216 is a predetermined threshold or more, thereby making determination in Step S218. If a negative determination is made in Step S218 (Step S218: No), the process returns to Step S204. If an affirmative determination is made in Step S218 (Step S218: Yes), this routine is ended.

As described above, the learning device 12 of the present embodiment includes the first learning unit 20 and the second learning unit 21. The second learning unit 21 learns the second object detection network 32 using the new learning data 42 different from the learning data 40 and the first object detection network 30 learned by the first learning unit 20.

That is, the second learning unit 21 of the learning device 12 of the present embodiment learns the second object detection network 32 using a learned model that is the first object detection network 30 learned by the first learning unit 20.

Therefore, the learning device 12 of the present embodiment can learn the second object detection network 32 that can be quickly adapted to a target object to which only a small amount of data is taught, for example. In other words, the learning device 12 of the present embodiment can learn the second object detection network 32 capable of outputting the class C that is an object detection result for an area where the class C included in the new learning data 42 is not taught in a shorter time using a small amount of the new learning data 42.

Therefore, in addition to the effects of the above embodiment, the learning device 12 of the present embodiment can learn the second object detection network 32 that can be quickly adapted to a small amount of the new learning data 42.

Third Embodiment

In the present embodiment, a detection device using at least one of the first object detection network 30 and the second object detection network 32 learned in the above embodiment will be described. In the present embodiment, the same reference numerals are given to components similar to those of the above embodiment, and a detailed description thereof will be omitted.

Figure 6:
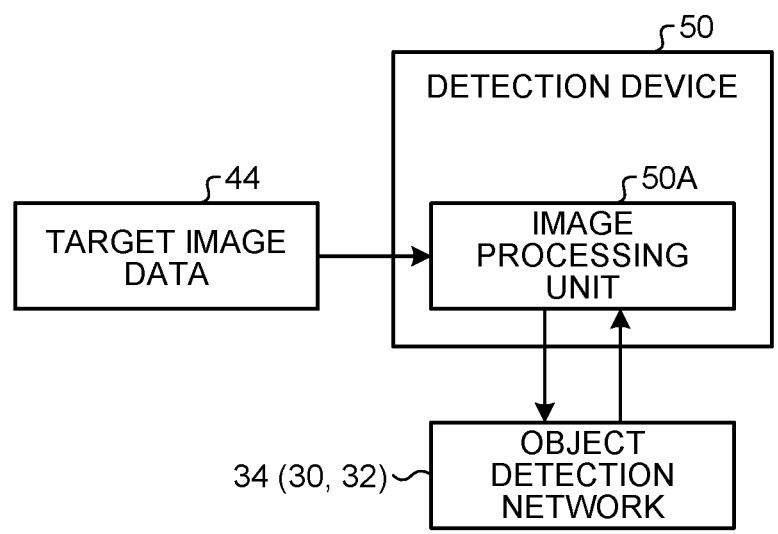
FIG. 6 is a schematic diagram of a detection device.

FIG. 6 is a schematic diagram of an example of a detection device 50 of the present embodiment.

The detection device 50 includes an image processing unit 50A. The image processing unit 50A is implemented by, for example, one or more processors.

The image processing unit 50A inputs target image data 44 of an object detection target to an object detection network 34. The target image data 44 is image data of an object detection target. The image processing unit 50A derives a class C representing an object detection result included in the target image data 44 and position information of an object in the target image data 44 as an output from the object detection network 34.

The object detection network 34 is at least one of the first object detection network 30 learned by the first learning unit 20 of the above embodiment and the second object detection network 32 learned by the second learning unit 21 of the above embodiment.

Next, an example of a flow of information processing executed by the detection device 50 of the present embodiment will be described.

Figure 7:
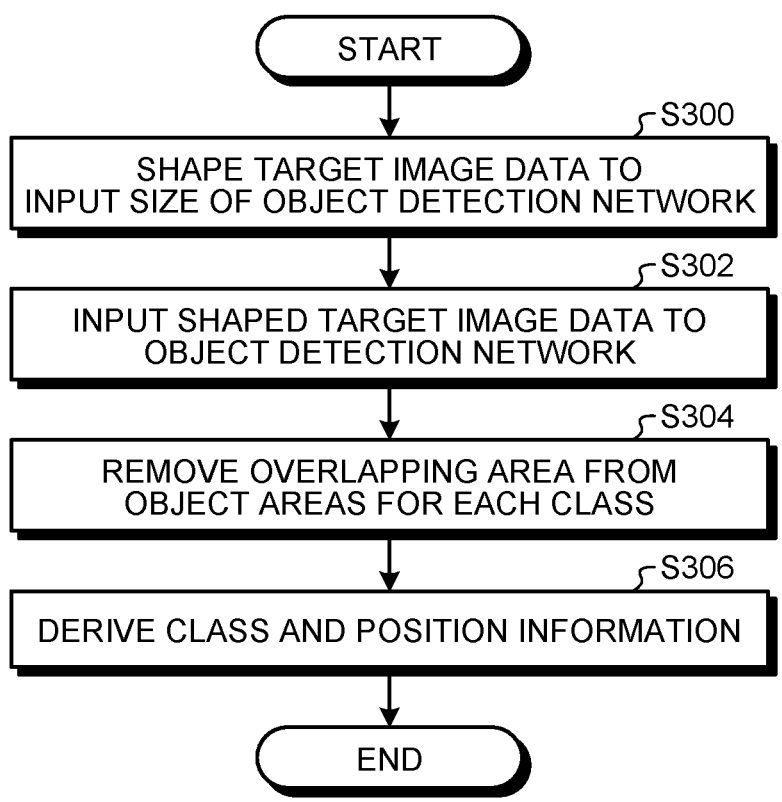
FIG. 7 is a flowchart of a flow of information processing.

FIG. 7 is a flowchart illustrating an example of a flow of information processing executed by the detection device 50 of the present embodiment.

The image processing unit 50A acquires the target image data 44 and shapes the acquired target image data 44 to an input size of the object detection network 34 (Step S300).

Then, the image processing unit 50A inputs the shaped target image data 44 to the object detection network 34 (Step S302).

The image processing unit 50A obtains a rectangular area representing an object area F for each class C representing an object detection result of the object area F, the rectangular area being output from the object detection network 34 by inputting the target image data 44 to the object detection network 34 in Step S302. Then, the image processing unit 50A removes an overlapping area between these object areas F from the object areas F for each class C (Step S304).

The plurality of rectangular areas, which are the object areas F for each class C output from the object detection network 34, may be detected in an overlapping manner. Therefore, the image processing unit 50A eliminates an overlapping area that is an overlapping rectangular area having a low detection score due to non maximum suppression (NMS) by the process in Step S304. Note that the image processing unit 50A preferably sets a threshold for reliability for each class C in advance. Then, the image processing unit 50A preferably reduces the number of rectangular areas detected for each class C by eliminating a rectangular area with reliability equal to or lower than the threshold determined for each class C. With this process, the image processing unit 50A can selectively detect a desired object from the target image data 44.

Then, the image processing unit 50A derives the class C of the object area F after the overlapping area is eliminated in Step S304 and the position information of the object area F (Step S306). Then, this routine is ended.

As described above, the image processing unit 50A of the detection device 50 of the present embodiment inputs the target image data 44 of an object detection target to the object detection network 34. The object detection network 34 is at least one of the first object detection network 30 learned by the first learning unit 20 of the above embodiment and the second object detection network 32 learned by the second learning unit 21 of the above embodiment. Then, the image processing unit 50A derives the class C representing an object detection result included in the target image data 44 and the position information of an object (object area F) in the target image data 44 as an output from the object detection network 34.

As described above, the first object detection network 30 and the second object detection network 32 are the object detection networks 34 in which the object detection accuracy is improved.

Therefore, by inputting the target image data 44 to the object detection network 34, the image processing unit 50A can derive the class C representing the object detection result and the position information of the object (object area F) in the target image data 44 with high accuracy as an output from the image processing unit 50A.

Therefore, the detection device 50 of the present embodiment can improve the object detection accuracy in addition to the effects of the above embodiment.

An applied target of the detection device 50 of the present embodiment is not limited. The detection device 50 of the present embodiment is suitably applied to, for example, person detection for a video captured by a security camera or vehicle detection for a video captured by an in-vehicle camera.

Fourth Embodiment

In the present embodiment, an example of a learning system including the learning device 12 and the detection device 50 of the above embodiment will be described. In the present embodiment, the same reference numerals are given to components similar to those of the above embodiment, and a detailed description thereof will be omitted.

Figure 8:
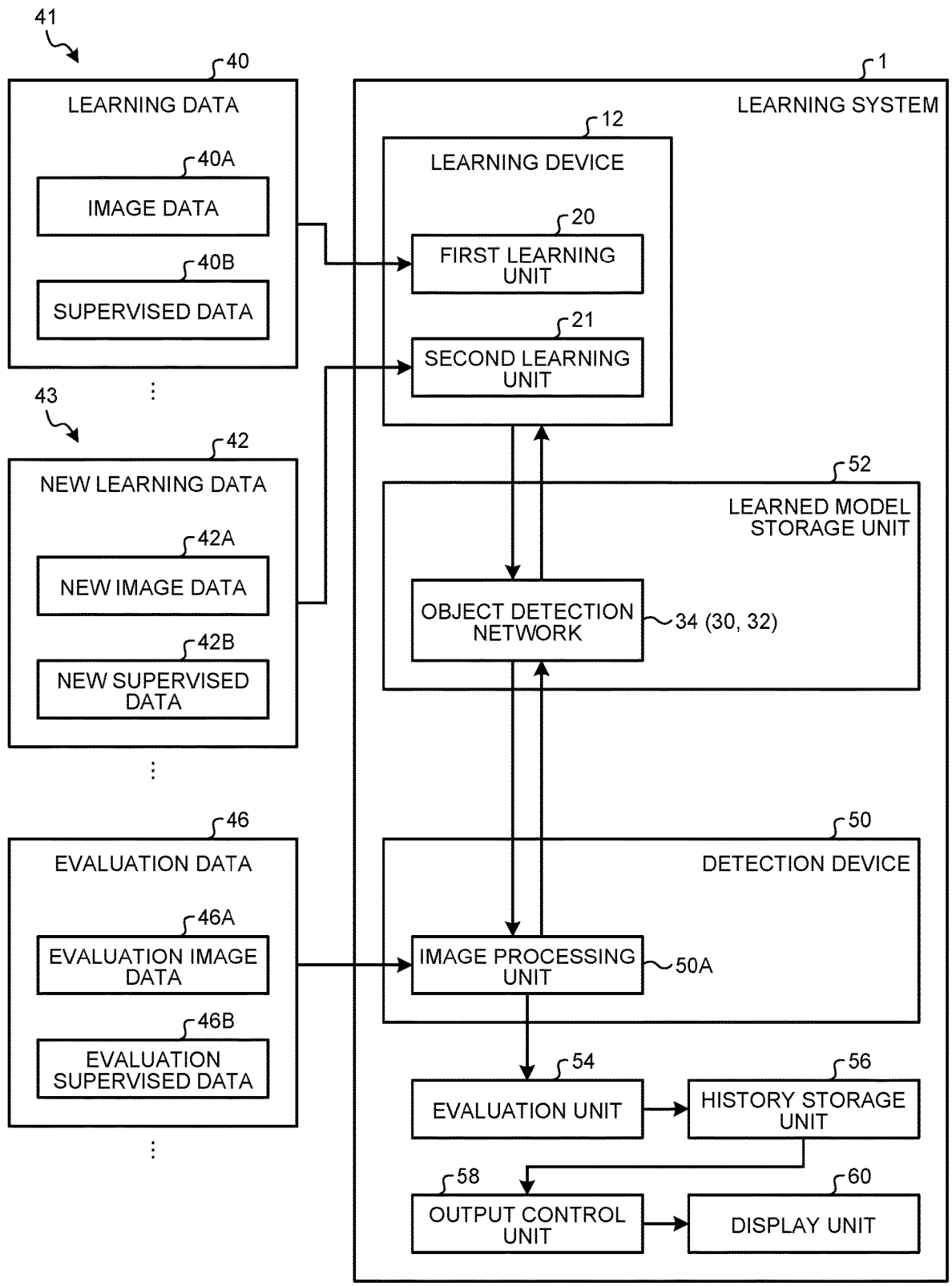
FIG. 8 is a schematic diagram of a learning system.

FIG. 8 is a schematic diagram of an example of a learning system 1 of the present embodiment.

The learning system 1 includes a learning device 12, a learned model storage unit 52, a detection device 50, an evaluation unit 54, a history storage unit 56, an output control unit 58, and a display unit 60. The learning device 12, the learned model storage unit 52, the detection device 50, the evaluation unit 54, the history storage unit 56, the output control unit 58, and the display unit 60 are communicably connected to each other. A first learning unit 20, a second learning unit 21, an image processing unit 50A, the evaluation unit 54, and the output control unit 58 are implemented by, for example, one or more processors.

The learning device 12 is similar to the learning device 12 of the above embodiment. The learning device 12 includes a first learning unit 20 and a second learning unit 21. The first learning unit 20 and the second learning unit 21 are similar to those of the above embodiment.

The learned model storage unit 52 stores an object detection network 34. Similar to the above embodiment, the object detection network 34 is at least one of a first object detection network 30 and a second object detection network 32. That is, the learned model storage unit 52 stores the learned first object detection network 30 and the learned second object detection network 32 learned by the learning device 12.

Similar to the above embodiment, an additional learning initialization unit 28 of the second learning unit 21 initializes the second object detection network 32 using the first object detection network 30 learned by the first learning unit 20. Then, the second learning unit 21 learns the second object detection network 32 using new learning data 42. The second learning unit 21 updates the second object detection network 32 of the learned model storage unit 52 at the end of learning or for each learning with the new learning data 42 including an arbitrary mini-batch size number of pieces of data.

The detection device 50 includes the image processing unit 50A. The detection device 50 and the image processing unit 50A are similar to those of the above embodiment. The fourth embodiment is similar to the above embodiment except that evaluation data 46 is used instead of the target image data 44.

The evaluation data 46 includes image data and supervised data used for evaluation of the object detection network 34. Specifically, the evaluation data 46 includes evaluation image data 46A and evaluation supervised data 46B.

The evaluation image data 46A only needs to be image data to which no supervised data is added. The evaluation image data 46A may be the same image data as the image data 40A or the new image data 42A, or may be different image data therefrom.

Similar to the supervised data 40B and the new supervised data 42B, the evaluation supervised data 46B is data directly or indirectly representing correct data to be output from the object detection network 34 when the evaluation image data 46A is input to the object detection network 34. In the present embodiment, the evaluation supervised data 46B includes a class C representing a correct object detection result of an object area F included in the evaluation image data 46A and position information of the object area F in the evaluation image data 46A. The object area F and the position information are similar to those in the above embodiment.

In the present embodiment, the image processing unit 50A inputs the evaluation image data 46A to the object detection network 34 instead of the target image data 44. Note that, in the present embodiment, a mode in which one piece of the evaluation image data 46A, that is, one piece of the evaluation image data 46A that is constant at all times is input to the image processing unit 50A will be described as an example. The image processing unit 50A derives the class C representing an object detection result included in the evaluation image data 46A and the position information of an object in the evaluation image data 46A as an output from the object detection network 34.

The evaluation unit 54 evaluates a detection result that is an output from the object detection network 34.

Using a detection result including the class C and the position information, which are the object detection results output from the object detection network 34, and the evaluation supervised data 46B, the evaluation unit 54 evaluates detection accuracy of the detection result.

Then, the evaluation unit 54 stores the evaluation image data 46A used for evaluation, the detection result, and the evaluation result in association with each other in the history storage unit 56 as history information. Note that the evaluation unit 54 may also store other information related to the object detection network 34 used for evaluation in association with the above information in the history storage unit 56. The other information may include, for example, a parameter of the object detection network 34 used for evaluation or information regarding the learning data 40 and the new learning data 42 used for learning of the object detection network 34.

The output control unit 58 outputs a learning result including at least one of the evaluation result of evaluation by the evaluation unit 54 and the detection result to the display unit 60. The display unit 60 is, for example, a display.

Figure 9:
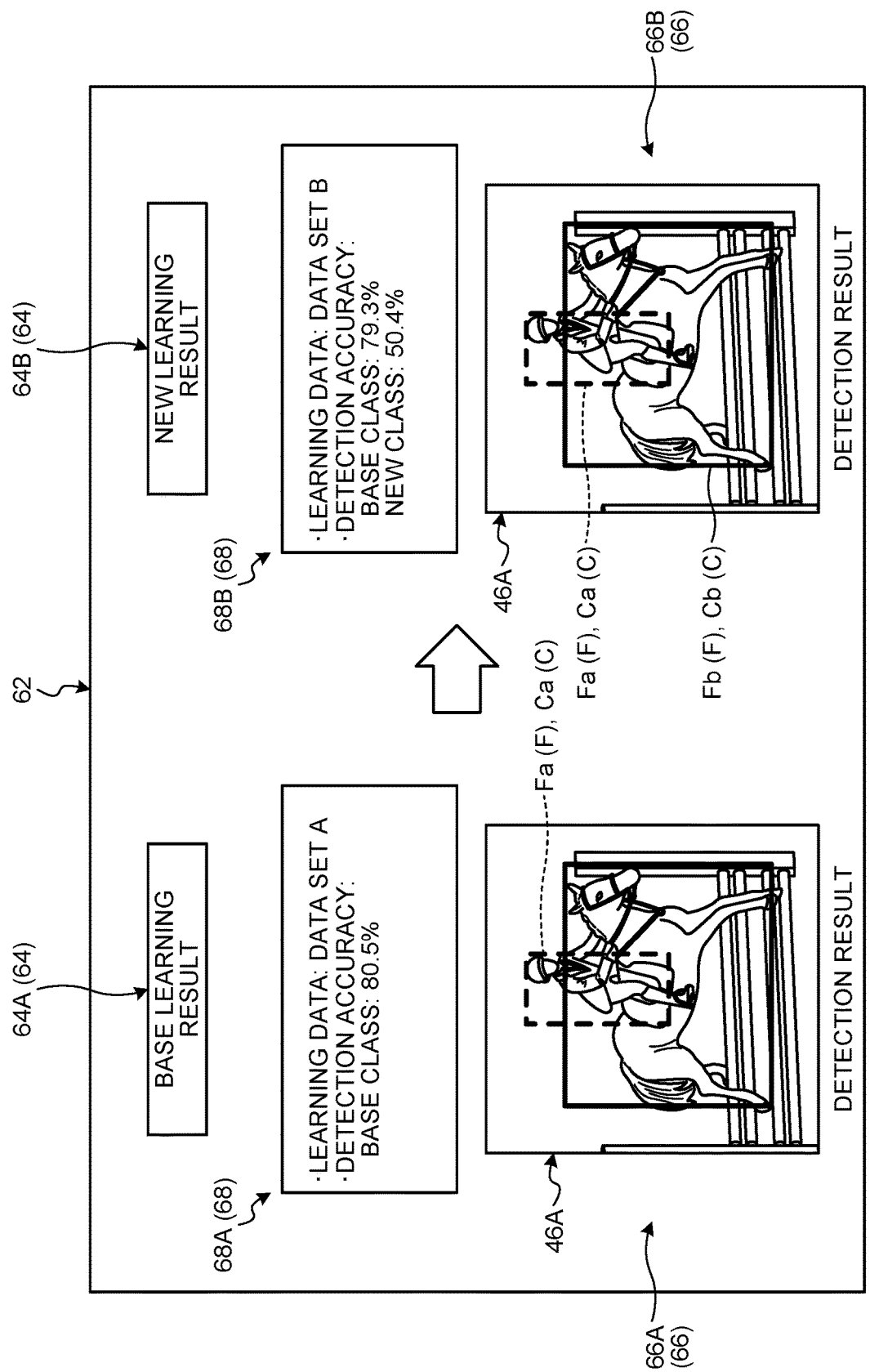
FIG. 9 is a schematic diagram of a display screen.

FIG. 9 is a schematic diagram of an example of a display screen 62 displayed on the display unit 60 by the output control unit 58.

For example, the output control unit 58 outputs the display screen 62 including a learning result 64 of each of the first object detection network 30 and the second object detection network 32 to the display unit 60.

The learning result 64 includes the evaluation image data 46A used for evaluation of the object detection network 34, a detection result 66 of the object detection network 34 using the evaluation image data 46A, and an evaluation result 68 of the detection result 66.

Specifically, the display screen 62 includes a learning result 64A and a learning result 64B as the learning result 64.

The learning result 64A is an example of the learning result 64 by the first object detection network 30. The learning result 64A includes the evaluation image data 46A used for evaluation of the first object detection network 30, a detection result 66A, and an evaluation result 68A.

Position information of an object area F included in the detection result 66A is represented, for example, by displaying a rectangular frame line representing the object area F on the evaluation image data 46A. FIG. 9 illustrates a rectangular frame line and a class Ca of an object area Fa as the object area F and the class C detected by the first object detection network 30 from the evaluation image data 46A. Note that character information indicating the class C of the object area F included in the detection result 66A is displayed, for example, in a display field of the evaluation result 68A.

The display field of the evaluation result 68A includes, for example, identification information of the learning data set 41 used for learning of the first object detection network 30 and detection accuracy of a detection result using the evaluation image data 46A by the first object detection network 30. FIG. 9 illustrates "data set A" as the identification information of the learning data set 41 used for learning of the first object detection network 30. In addition, FIG. 9 illustrates "base class" that is the class Ca detected from the evaluation image data 46A and detection accuracy "80.5%" of the class Ca as detection accuracy of the detection result using the evaluation image data 46A by the first object detection network 30.

The learning result 64B is an example of the learning result 64 by the second object detection network 32. The learning result 64B includes the evaluation image data 46A used for evaluation of the second object detection network 32, a detection result 66B, and an evaluation result 68B.

Position information of an object area F included in the detection result 66B is represented, for example, by displaying a rectangular frame line representing the object area F on the evaluation image data 46A. FIG. 9 illustrates a rectangular frame line and a class Ca of an object area Fa and a rectangular frame line and a class Cb of an object area Fb as the object area F and the class C detected by the second object detection network 32 from the evaluation image data 46A. Note that character information indicating the class C of the object area F included in the detection result 66B is displayed in a field or the like of the evaluation result 68B.

The display field of the evaluation result 68B includes, for example, identification information of the new learning data set 43 used for learning of the second object detection network 32 and detection accuracy of a detection result using the evaluation image data 46A by the second object detection network 32. FIG. 9 illustrates "data set B" as the identification information of the new learning data set 43 used for learning of the second object detection network 32. In addition, FIG. 9 illustrates "base class" that is the class Ca detected from the evaluation image data 46A and detection accuracy "79.3%" of the class Ca, and "new class" that is a detected class Cb and detection accuracy "50.4%" of the class Cb, as detection accuracy of the detection result using the evaluation image data 46A by the second object detection network 32.

As described above, in the present embodiment, the output control unit 58 outputs the display screen 62 including the learning result 64 of each of the first object detection network 30 and the second object detection network 32 to the display unit 60. In addition, the output control unit 58 outputs, to the display unit 60, the different learning results 64 by the first object detection network 30 and the second object detection network 32 for the same evaluation image data 46A.

Therefore, the learning system 1 of the present embodiment can provide a list of changes in the learning result 64 so as to be easily confirmed.

Note that every time the second learning unit 21 newly acquires the new learning data 42 having a mini-batch size and learns the second object detection network 32, the evaluation unit 54 may evaluate the detection result 66 of the second object detection network 32 for the evaluation image data 46A. Then, every time the evaluation unit 54 evaluates the detection result 66 of the second object detection network 32, the output control unit 58 may output the display screen 62 to which the learning result 64 including the new evaluation result 68 of the evaluation is further added to the display unit 60.

In this case, the learning system 1 of the present embodiment can provide a list of changes in the learning result 64 according to the degree of progress of learning of the second object detection network 32 so as to be easily confirmed.

Next, an example of a flow of information processing executed by the learning system 1 of the present embodiment will be described.

Figure 10:
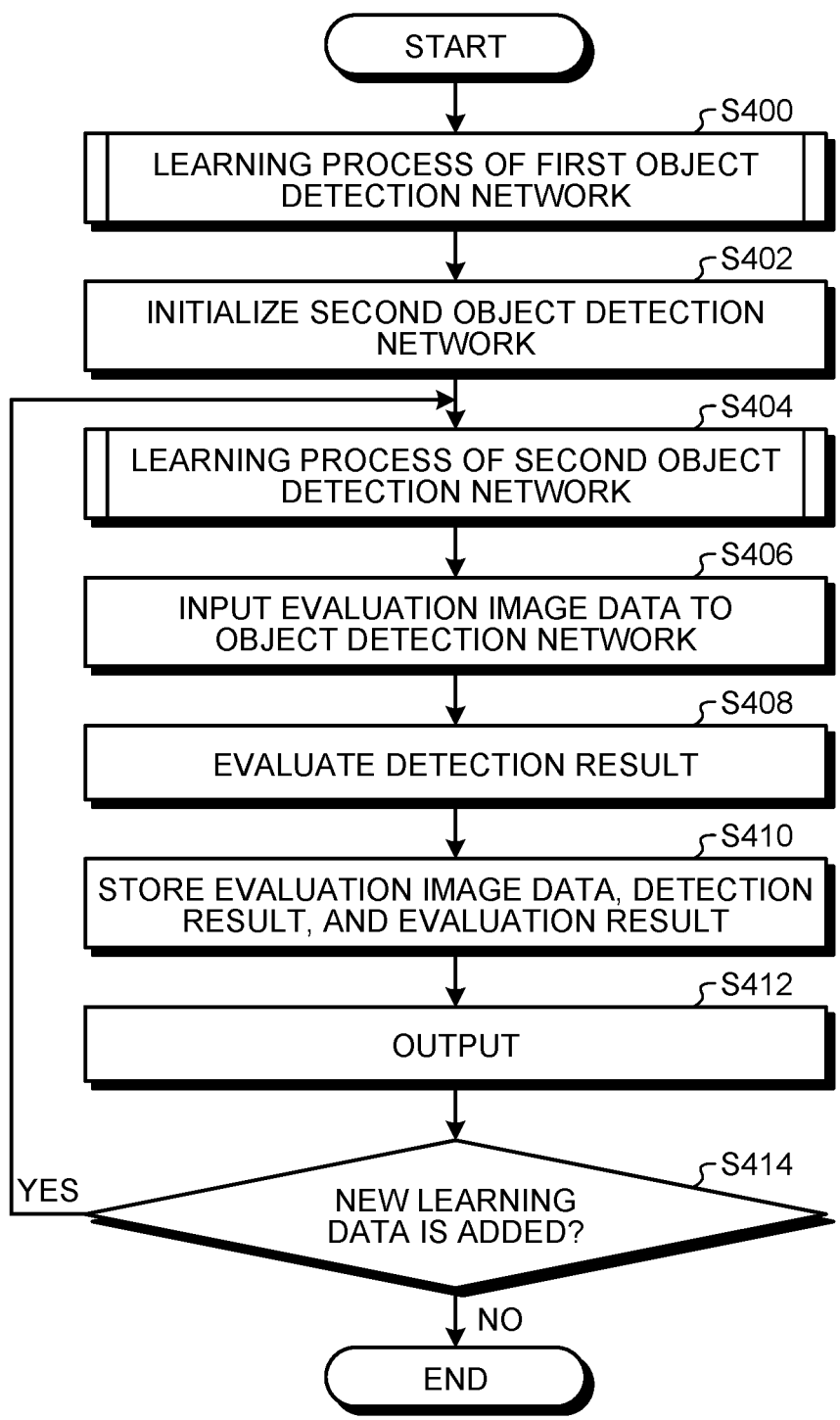
FIG. 10 is a flowchart of a flow of information processing.

FIG. 10 is a flowchart illustrating an example of a flow of information processing executed by the learning system 1 of the present embodiment.

The first learning unit 20 executes a learning process of the first object detection network 30 using the learning data 40 (Step S400). The process in Step S400 is similar to the processes in Steps S100 to S114 of the above embodiment (see FIG. 3).

Next, the additional learning initialization unit 28 of the second learning unit 21 initializes the second object detection network 32 using the first object detection network 30 learned by the first learning unit 20 in Step S400 (Step S402).

Next, the second learning unit 21 executes a learning process of the second object detection network 32 (Step S404). The process in Step S404 is similar to the processes in Steps S204 to S218 of the above embodiment (see FIG. 5).

Next, the image processing unit 50A inputs the same evaluation image data 46A to each of the first object detection network 30 learned by the first learning unit 20 and the second object detection network 32 learned by the second learning unit 21 (Step S406).

Using the detection result 66 including the class C and the position information, which are an object detection result output from each of the first object detection network 30 and the second object detection network 32, and the evaluation supervised data 46B, the evaluation unit 54 evaluates detection accuracy of each of the detection results 66 (Step S408).

Then, the evaluation unit 54 stores the evaluation image data 46A used for evaluation, the detection result 66, and the evaluation result 68 in association with each other in the history storage unit 56 as history information (Step S410).

The output control unit 58 outputs the learning result 64 based on the history information stored in Step S410 and the evaluation result 68 in Step S408 to the display unit 60 (Step S412).

Next, the learning system 1 determines whether or not the new learning data 42 is added (Step S414). If an affirmative determination is made in Step S414 (Step S414: Yes), the process returns to Step S404, and learning of the second object detection network 32 using the newly added new learning data 42 is performed. Meanwhile, if a negative determination is made in Step S414 (Step S414: No), this routine is ended.

As described above, the learning system 1 of the present embodiment includes the learning device 12, the detection device 50, the evaluation unit 54, and the output control unit 58. The evaluation unit 54 evaluates the detection result 66 that is an output from the object detection network 34 that is at least one of the first object detection network 30 and the second object detection network 32. The output control unit 58 outputs the learning result 64 including at least one of the detection result 66 and the evaluation result 68 of evaluation.

As described above, the learning system 1 of the present embodiment detects an object from the evaluation image data 46A using the object detection network 34 that is a learned model learned by the learning device 12, and derives the detection result 66 including the class C representing an object detection result of the object area F and the position information of the object area F. Then, the learning system 1 outputs the learning result 64 including at least one of the detection result 66 of at least one of the first object detection network 30 and the second object detection network 32 included in the object detection network 34 and the evaluation result 68 of the detection result 66 to the display unit 60 or the like.

Therefore, the learning system 1 of the present embodiment can easily provide, to a user, a learning situation of the object detection network 34, the evaluation result 68 of object detection accuracy by the object detection network 34, and the like in addition to the effects of the above embodiment.

In addition, the learning system 1 of the present embodiment outputs the display screen 62 including the learning result 64 of each of the first object detection network 30 and the second object detection network 32 on the display unit 60. Therefore, the learning system 1 of the present embodiment can provide the plurality of learning results 64 to a user so as to be easily confirmed.

Next, an example of a hardware configuration of the learning device 10, the learning device 12, the detection device 50, and the learning system 1 of the above embodiment will be described.

Figure 11:
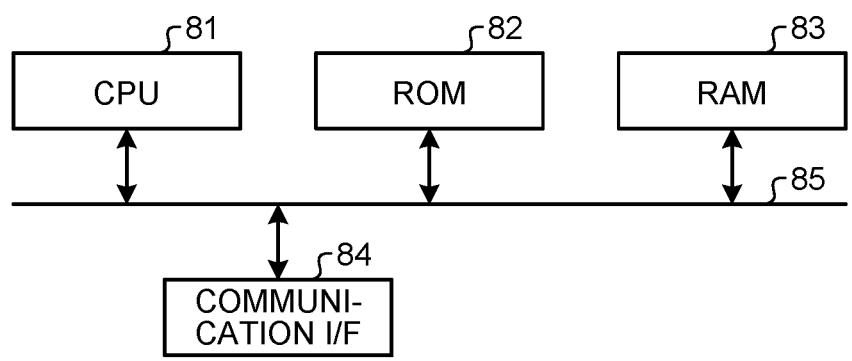
FIG. 11 is a hardware configuration diagram.

FIG. 11 is a hardware configuration diagram of an example of the learning device 10, the learning device 12, the detection device 50, and the learning system 1 of the above embodiment.

In the learning device 10, the learning device 12, the detection device 50, and the learning system 1 of the above embodiment, a central processing unit (CPU) 81, a read only memory (ROM) 82, a random access memory (RAM) 83, a communication I/F 84, and the like are connected to each other via a bus 85, and a hardware configuration using a normal computer is adopted.

The CPU 81 is an arithmetic device that controls the learning device 10, the learning device 12, the detection device 50, and the learning system 1 of the above embodiment. The ROM 82 stores a program and the like for implementing various processes by the CPU 81. Although the description is given using the CPU here, a graphics processing unit (GPU) may be used as the arithmetic device that controls the learning device 10, the learning device 12, the detection device 50, and the learning system 1. The RAM 83 stores data necessary for various processes by the CPU 81. The communication I/F 84 is an interface for transmitting and receiving data by being connected to the display unit 60 or the like.

In the learning device 10, the learning device 12, the detection device 50, and the learning system 1 of the above embodiment, the CPU 81 reads a program from the ROM 82 onto the RAM 83 and executes the program, whereby the above functions are implemented on the computer.

Note that the program for executing each of the above processes executed by the learning device 10, the learning device 12, the detection device 50, and the learning system 1 of the above embodiment may be stored in a hard disk drive (HDD). In addition, the program for executing each of the above processes executed by the learning device 10, the learning device 12, the detection device 50, and the learning system 1 of the above embodiment may be provided by being incorporated in the ROM 82 in advance.

In addition, the program for executing the above processes executed by the learning device 10, the learning device 12, the detection device 50, and the learning system 1 of the above embodiment may be stored in a computer-readable storage medium such as a CD-ROM, a CD-R, a memory card, a digital versatile disk (DVD), or a flexible disk (FD) as a file in an installable format or an executable format and provided as a computer program product. In addition, the program for executing the above processes executed by the learning device 10, the learning device 12, the detection device 50, and the learning system 1 of the above embodiment may be provided by being stored on a computer connected to a network such as the Internet and downloaded via the network. In addition, the program for executing the above processes executed by the learning device 10, the learning device 12, the detection device 50, and the learning system 1 of the above embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device comprising:
   first processing circuitry configured to:
   using learning data including image data and supervised data including a class representing a correct object detection result of an object area included in the image data and position information of the object area in the image data, learn a first object detection network for detecting an object from target image data so as to reduce a first loss between an output of the first object detection network and the supervised data; and
   using the image data and self-supervised data generated from the image data, learn the first object detection network so as to reduce a second loss of a feature amount of a corresponding candidate area between the image data and the self-supervised data, the second loss being derived by the first object detection network.

2. The learning device according to claim 1, wherein the first processing circuitry is further configured to:
   generate the self-supervised data that is converted image data obtained by image-converting the image data, and specify the corresponding candidate area from each of the image data and the self-supervised data; and
   calculate the second loss of a feature amount of the corresponding candidate area in the self-supervised data with respect to a feature amount of the candidate area in the image data, the second loss being derived by the first object detection network by inputting the image data and the self-supervised data to the first object detection network.

3. The learning device according to claim 2, wherein the first processing circuitry is further configured to:
   specify, as the candidate area, a randomly specified area or an area specified by a foreground extraction method for extracting an object-like area from the image data and the self-supervised data.

4. The learning device according to claim 2, wherein the first processing circuitry is further configured to:
   specify, from each of the image data and the self-supervised data, the candidate area at least partially including a non-overlapping area in the object area.

5. The learning device according to claim 2, wherein the first processing circuitry is further configured to:
   perform at least one image conversion among luminance conversion, color tone conversion, contrast conversion, inversion, rotation, and cropping on the image data to generate the self-supervised data.

6. The learning device according to claim 1, wherein the first processing circuitry is further configured to:
   learn a second object detection network using new learning data different from the learning data and using the first object detection network.

7. A detection device comprising:
   second processing circuitry configured to:
   input target image data of an object detection target to an object detection network that is at least one of the first object detection network learned by the first processing circuitry included in the learning device according to claim 6 and a second object detection network learned by the first processing circuitry included in the learning device, and drive, as an output from the object detection network, a class representing an object detection result included in the target image data and position information of an object in the target image data.

8. A learning system comprising:
   the detection device according to claim 7;
   the learning device; and
   third processing circuitry configured to:
   evaluate a detection result that is an output from an object detection network that is at least one of the first object detection network and the second object detection network; and
   output a learning result including at least one of the detection result and an evaluation result of the evaluation.

9. The learning system according to claim 8, wherein the third processing circuitry is further configured to:
   output a display screen including the learning result of each of the first object detection network and the second object detection network to a display.

10. A detection method comprising:
    inputting target image data of an object detection target to an object detection network that is at least one of the first object detection network learned by the first processing circuitry included in the learning device according to claim 6 and the second object detection network learned by the first processing circuitry included in the learning device, and deriving, as an output from the object detection network, a class representing an object detection result included in the target image data and position information of an object in the target image data.

11. A non-transitory computer-readable medium storing instructions that, when executed by one or more processors of a device, cause the device to:
input target image data of an object detection target to an object detection network that is at least one of the first object detection network learned by the first processing circuitry included in the learning device according to claim 6 and the second object detection network learned by the first processing circuitry included in the learning device, and derive, as an output from the object detection network, a class representing an object detection result included in the target image data and position information of an object in the target image data.

12. A learning method comprising:
using learning data including image data and supervised data including a class representing a correct object detection result of an object area included in the image data and position information of the object area in the image data, learning a first object detection network for detecting an object from target image data so as to reduce a first loss between an output of the first object detection network and the supervised data; and
using the image data and self-supervised data generated from the image data, learning the first object detection network so as to reduce a second loss of a feature amount of a corresponding candidate area between the image data and the self-supervised data, the second loss being derived by the first object detection network.

13. The learning method according to claim 12, further comprising:
generating the self-supervised data that is converted image data obtained by image-converting the image data, and specifying the corresponding candidate area from each of the image data and the self-supervised data; and
calculating the second loss of a feature amount of the corresponding candidate area in the self-supervised data with respect to a feature amount of the candidate area in the image data, the second loss being derived by the first object detection network by inputting the image data and the self-supervised data to the first object detection network.

14. The learning method according to claim 13, further comprising:
specifying, as the candidate area, a randomly specified area or an area specified by a foreground extraction method for extracting an object-like area from the image data and the self-supervised data.

15. The learning method according to claim 13, further comprising:
specifying, from each of the image data and the self-supervised data, the candidate area at least partially including a non-overlapping area in the object area.

16. The learning method according to claim 13, further comprising:
performing at least one image conversion among luminance conversion, color tone conversion, contrast conversion, inversion, rotation, and cropping on the image data to generate the self-supervised data.

17. The learning method according to claim 12, further comprising:
learning a second object detection network using new learning data different from the learning data and using the first object detection network.

18. A non-transitory computer-readable medium storing instructions that, when executed by one or more processors of a device, cause the device to:
using learning data including image data and supervised data including a class representing a correct object detection result of an object area included in the image data and position information of the object area in the image data, learn a first object detection network for detecting an object from target image data so as to reduce a first loss between an output of the first object detection network and the supervised data; and
using the image data and self-supervised data generated from the image data, learn the first object detection network so as to reduce a second loss of a feature amount of a corresponding candidate area between the image data and the self-supervised data, the second loss being derived by the first object detection network.

19. The non-transitory computer-readable medium according to claim 16, wherein the instructions further cause the device to:
generate the self-supervised data that is converted image data obtained by image-converting the image data, and specify the corresponding candidate area from each of the image data and the self-supervised data; and
calculate the second loss of a feature amount of the corresponding candidate area in the self-supervised data with respect to a feature amount of the candidate area in the image data, the second loss being derived by the first object detection network by inputting the image data and the self-supervised data to the first object detection network.

20. The non-transitory computer-readable medium according to claim 19, wherein the instructions further cause the device to:
specify, as the candidate area, a randomly specified area or an area specified by a foreground extraction method for extracting an object-like area from the image data and the self-supervised data.

21. The non-transitory computer-readable medium according to claim 18, wherein the instructions further cause the device to:
specify, from each of the image data and the self-supervised data, the candidate area at least partially including a non-overlapping area in the object area.

22. The non-transitory computer-readable medium according to claim 18, wherein the instructions further cause the device to:
perform at least one image conversion among luminance conversion, color tone conversion, contrast conversion, inversion, rotation, and cropping on the image data to generate the self-supervised data.

23. The non-transitory computer-readable medium according to claim 18, wherein the instructions further cause the device to:
learn a second object detection network using new learning data different from the learning data and using the first object detection network.

\* \* \* \* \*